United States Patent
Roell et al.

(10) Patent No.: US 9,807,940 B2
(45) Date of Patent: Nov. 7, 2017

(54) SYSTEM FOR PREDICTION AND CONTROL OF DRYDOWN FOR WINDROWED AGRICULTURAL PRODUCTS

(71) Applicant: Deere & Company, Moline, IL (US)

(72) Inventors: Jerome J. Roell, West Des Moines, IA (US); Terence D. Pickett, Waukee, IA (US)

(73) Assignee: Deere & Company, Moline, IL (US)

( * ) Notice: Subject to any disclaimer, the term of this patent is extended or adjusted under 35 U.S.C. 154(b) by 41 days.

(21) Appl. No.: 14/871,439

(22) Filed: Sep. 30, 2015

(65) Prior Publication Data

US 2017/0086381 A1     Mar. 30, 2017

(51) Int. Cl.
*A01F 15/08*       (2006.01)
*G05B 15/02*      (2006.01)
*A01F 15/07*       (2006.01)

(52) U.S. Cl.
CPC .......... *A01F 15/08* (2013.01); *A01F 15/0833* (2013.01); *A01F 2015/077* (2013.01); *G05B 15/02* (2013.01)

(58) Field of Classification Search
CPC .... A01B 79/005; A01D 34/008; G07C 5/006; G07C 5/08; A01F 15/101; A01F 15/046; A01F 15/042; A01F 2015/102; A01F 15/08; A01F 15/0833; A01F 2015/077; G06Q 10/06; G06Q 50/02; G06Q 30/04; G05B 15/02

USPC .................. 705/34; 718/100; 701/50; 239/1
See application file for complete search history.

(56) References Cited

U.S. PATENT DOCUMENTS

| | | | |
|---|---|---|---|
| 7,167,797 B2 | 1/2007 | Faivre et al. | |
| 7,930,085 B2 | 4/2011 | Anderson et al. | |
| 2011/0270723 A1* | 11/2011 | O'Neil | G06Q 10/06 705/34 |
| 2014/0165528 A1* | 6/2014 | Olander | A01F 15/106 56/341 |
| 2015/0223416 A1* | 8/2015 | Eng | G05B 15/02 700/284 |

* cited by examiner

*Primary Examiner* — Nga X Nguyen
(74) *Attorney, Agent, or Firm* — James P. Muraff; Neal, Gerber & Eisenberg LLP

(57) ABSTRACT

Systems and methods for optimizing the collection of a windrowed crop are described. In an exemplary implementation, conditions data is accessed and used to estimate the moisture content of a windrowed crop. The estimated moisture content is used to create an optimal collection prescription for the operation of baling equipment to collect the crop. During the collection of the crop, the moisture content of the crop is measured and compared to the estimated moisture value. The system may then revise the optimal collection prescription based on the measured moisture value. This process can then be repeated until all of the windrowed crop is collected.

22 Claims, 4 Drawing Sheets

SYSTEM FOR PREDICTION AND CONTROL OF DRYDOWN FOR WINDROWED AGRICULTURAL PRODUCTS

TECHNICAL FIELD

The following disclosure relates to optimizing the collection of a windrowed agricultural product such as hay.

BACKGROUND OF THE INVENTION

Many types of agricultural and forage products such as hay, grain, or alfalfa must be partially dried after harvest in order to enable baling for efficient transport and consumption. This drying is achieved by cutting and crimping the crop into rows called windrows, which are then allowed to dry in the sun until the desired moisture content is reached.

In commercial hay harvesting applications in areas such as the Southwestern United States, hay collection must be critically timed to ensure the windrowed hay is dried down enough to prevent baled hay from molding, but not so far that the leaf stems of the harvested hay become brittle and break during the baling process. Due to this limitation, in these dryer areas, baling can only be done in a very narrow window of time during the day, thus limiting overall productivity. In other areas where drydown is much more variable due to unpredictable weather, the quickest possible drydown is usually chosen to minimize the risk of overdrying the crop. However, this means that a harvester can only cut as much crop as he is sure can be collected before the drying process has gone too far, thus impeding overall productivity.

Certain algorithms are available that can estimate collection times for windrowed crops based on estimated inputs such as the weather forecast and known crop parameters such as the maturity of the crop at harvest. However, the results of these algorithms are general in nature and cannot account for the wide variety of microclimates that may be present in any given field of windrowed crop to be collected. Further, these algorithms cannot account for sudden changes to conditions that may impact a crop's optimal drydown time. Accordingly, there is a need for a system to optimize the collection of a windrowed crop based on all parts of a crop's field and actual conditions in that field.

SUMMARY OF THE INVENTION

Systems and methods are provided for optimizing the collection of a windrowed crop. The systems can include a baling machine equipped with one or more sensors, a user interface device, and a computer processor configured to receive first condition data to estimate a moisture level of the crop, determine first optimal collection parameters based on the first condition data, receive a measured moisture level of the crop during the collection of a first crop portion from the baler's sensors, determine revised optimal collection parameters based on the measured moisture level of the crop, and alert an end user of a recommended schedule for collecting a second portion of the crop in accordance with the revised optimal collection parameters. These systems and methods have particular, but not exclusive, applicability to website applications associated with the Internet.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION OF EXEMPLARY EMBODIMENTS OF THE INVENTION

Figure 1:
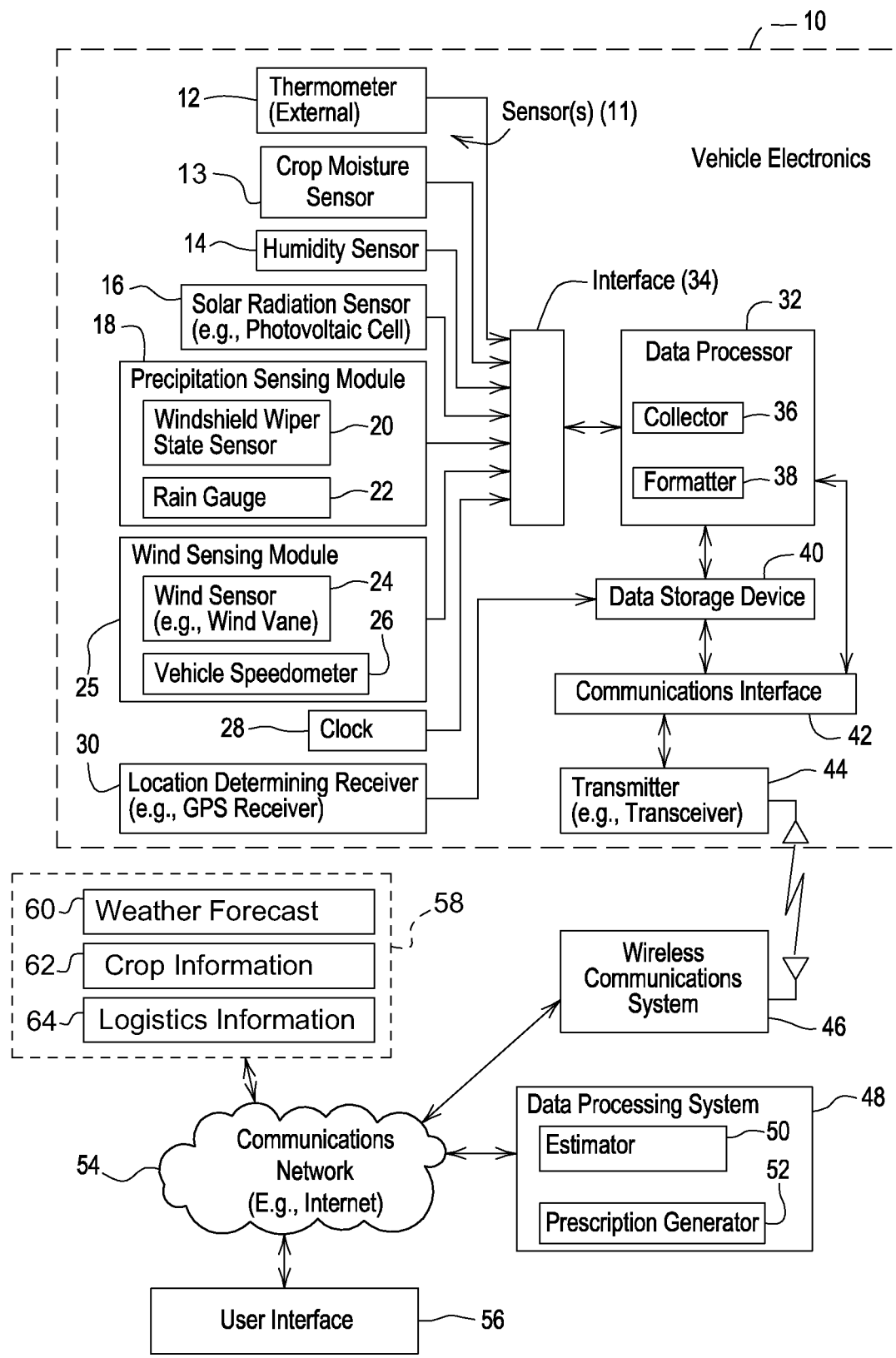
FIG. 1 is a schematic diagram illustrating an exemplary embodiment of a system in accordance with the invention.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 illustrates components of an exemplary embodiment system in accordance with the invention. The system enables the optimization of the collection of a windrowed agricultural crop such as hay. However, those of ordinary skill in the art will recognize that the systems and methods disclosed herein could be applied to the collection of any windrowed agricultural crop, grain, or forage product without departing from the novel scope of the present invention.

As shown in FIG. 1, the system includes a data processing system 48 in communication with a user interface 56 and a vehicle electronics module 10. The data processing system 48 communicates with the user interface 56 via a communications network 54 such as the Internet. The data processing system 48 communicates with the vehicle electronics module 10 via a wireless communications system 46. In other embodiments the data processing system 48 can communicate with the vehicle electronics module 10 through a USB connection. The data processing system 48 includes an estimator 50 and a prescription generator 52. The estimator 50 enables the estimation of certain parameters such as crop moisture content, crop weight per harvested land area, or crop volume per harvested land area based on estimated or known inputs such as actual or predicted weather conditions, time of day, harvested field land area, crop type, and crop maturity. The prescription generator 52 determines an optimal collection plan based on parameters such as crop moisture content, the availability of transport for the crop once it has been baled, and the capacity or productivity of the particular machine that will be used for baling the crop. The collection prescription can be defined by a particular date and time, baler speed, and/or specific windrows or geographic locations within the crop field. For example, the collection prescription may include different collection speeds per windrow, a date and time to collect each windrow or a subset of windrows, a starting location for baling a field, or a pattern for baling that is consecutive windrows, non-consecutive windrows, a substantially symmetric pattern of windrows, an asymmetric pattern of windrows, or a combination thereof. Both the estimator 50 and prescription generator 52 utilize publically available drydown algorithms that are specific to the particular type of crop being collected.

The vehicle electronics module 10 includes a variety of sensors to detect various field conditions. The sensors include a thermometer 12, a crop moisture sensor 13, a humidity sensor 14, a solar radiation sensor 16, a windshield wiper state sensor 20, a rain gauge 22, a wind sensor 24, a speedometer 26, a clock 28, and a location determining receiver 30 such as a GPS receiver. Collectively, these sensors allow the module 10 to measure the weather and crop moisture conditions in a specific location in a crop field at a specific time. These conditions can include temperature, humidity, change in temperature, wind speed, and wind direction. The module 10 can collect, format, and store this condition data until it is then transmitted to the data processing system 48 via the wireless communications system 46. In this embodiment, the vehicle electronics module 10 is integrated into one or more baling machines used to collect the windrowed crop. However, those of ordinary skill in the art will recognize that the structure and function of the vehicle electronics module 10 could be incorporated into one or more stationary weather stations placed throughout the crop field with departing from the novel scope of the present invention.

The user interface 56 allows the operator of the system to view the collection prescription and any revisions thereto as determined by the prescription generator 52 as well as alerts created by the system. The user interface 56 can also allow the system operator to input data for use by the data processing system 48 or to access external data sources 58. In certain embodiments, the data processing system 48 can access the external data sources 58 directly without user intervention. External data sources 58 can include forecasted weather conditions, information about the particular crop to be collected, or logistics information regarding the availability of machinery for the collection and transport of the crop. Here, the user interface 56 is an application running on the operator's smartphone or other wireless device. However, the user interface 56 may also be integrated into one or more baling machines being used to collect the crop.

Figure 2:
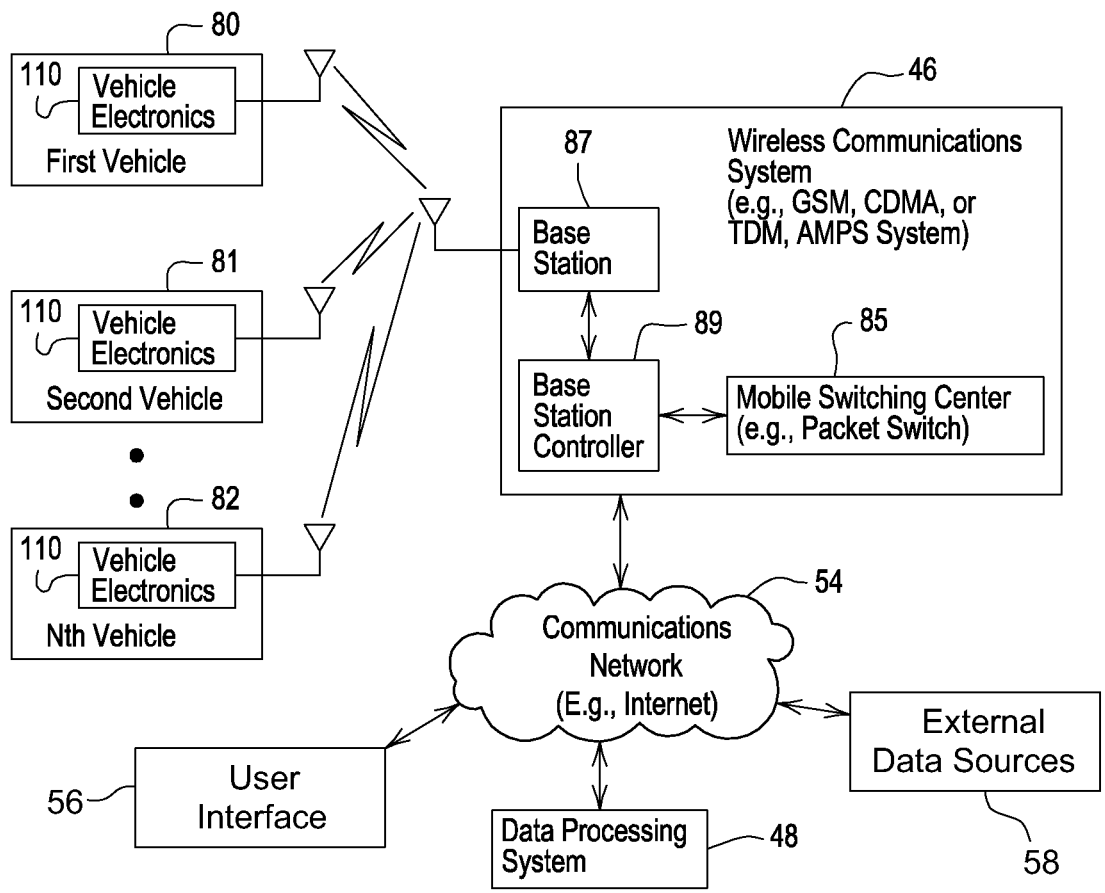
FIG. 2 is a schematic diagram that graphically depicts an embodiment of the invention showing more detail of a wireless communication system and the use of multiple vehicles.

As shown in FIG. 2, the system can function with one or more baling vehicles each equipped with a vehicle electronics module 10. Each module 10 can wirelessly communicate with one or more base stations 87 in the wireless communication system 46. Thus, the data processing system 48 can receive and process conditions data from multiple points around a crop field at the same time.

Figure 3:
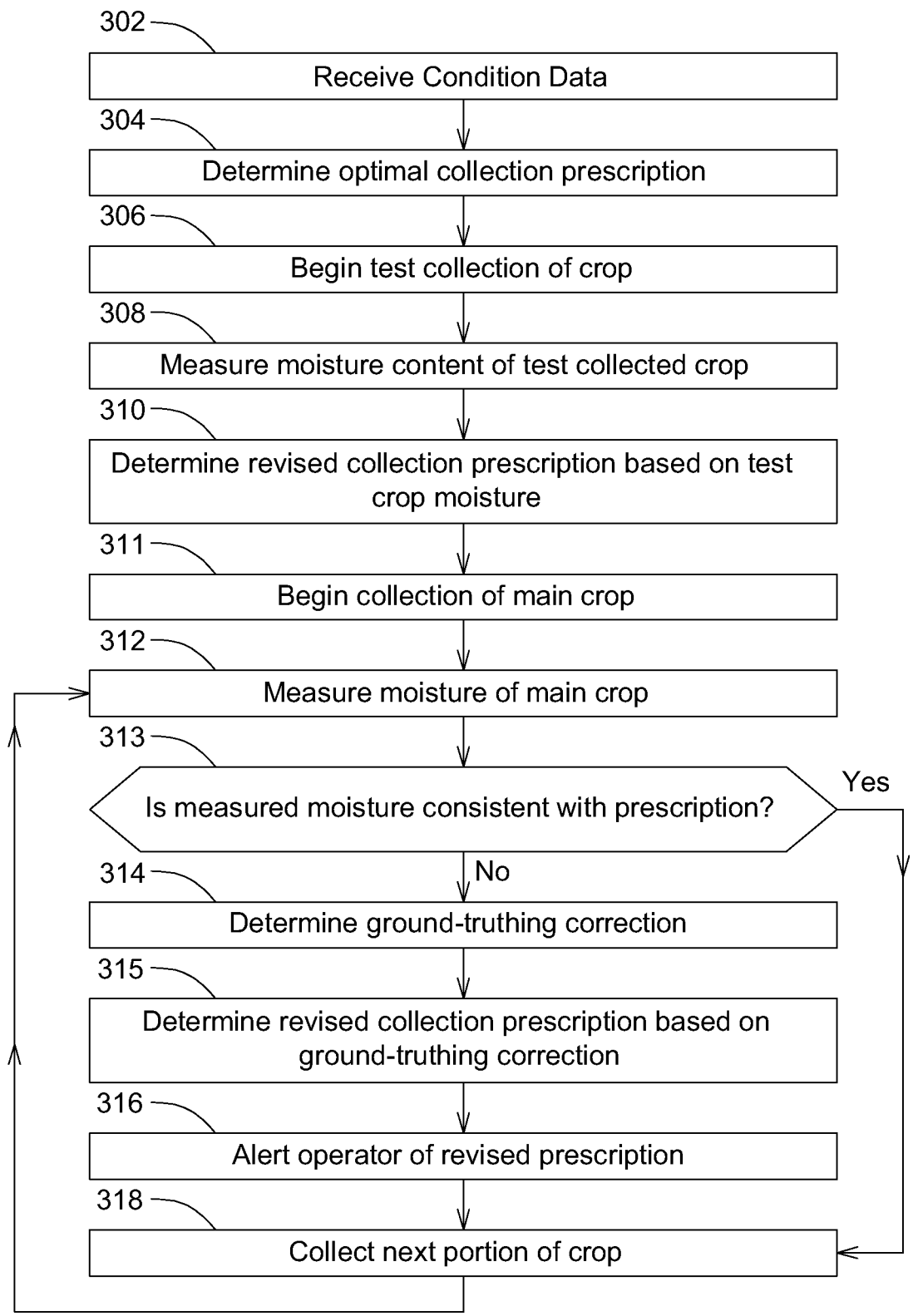
FIG. 3 is a flowchart of one embodiment of a method for optimizing the collection of a windrowed crop in accordance with the invention.
Figure 4:
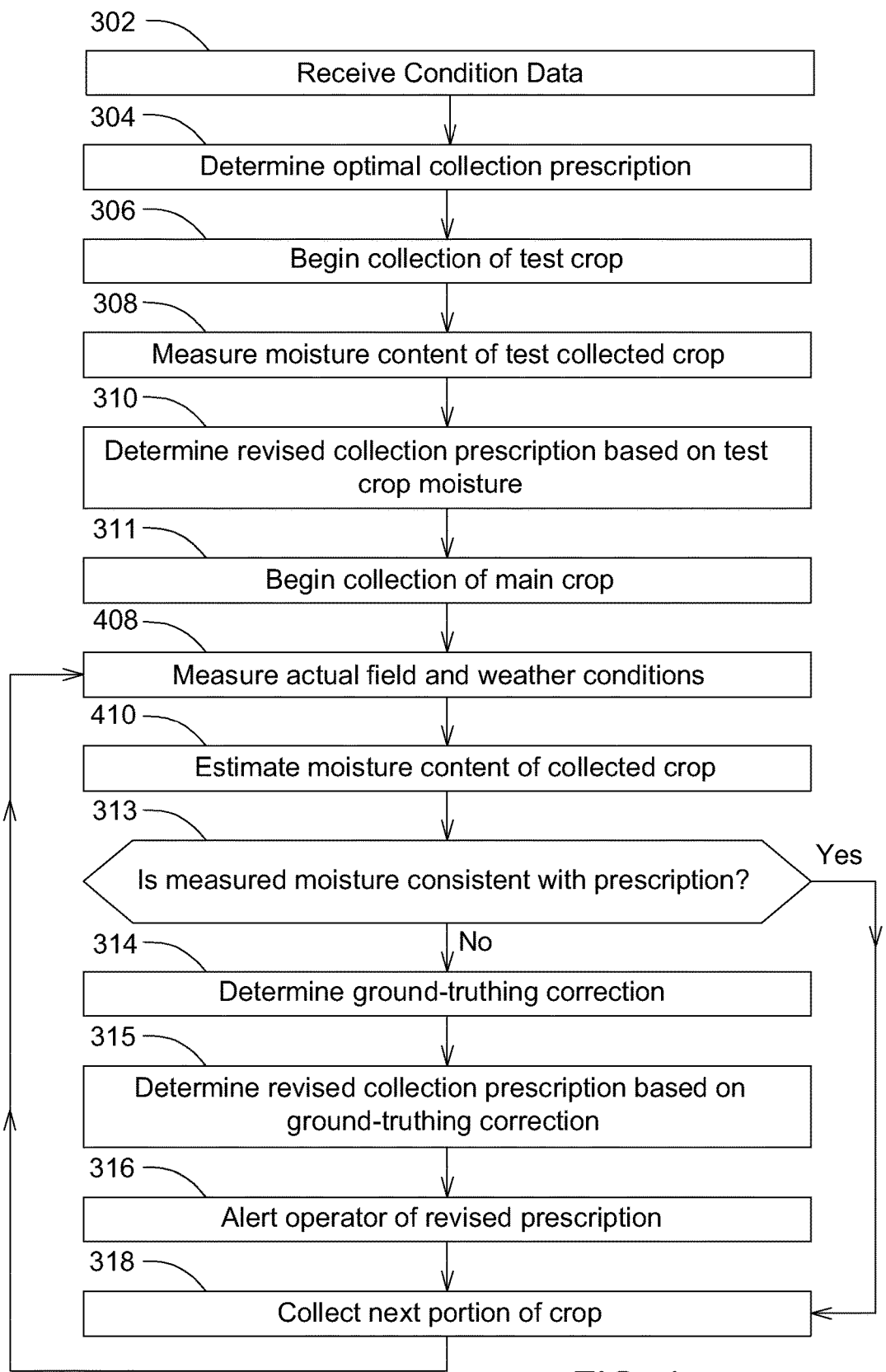
FIG. 4 is a flowchart of another embodiment of a method for optimizing the collection of a windrowed crop in accordance with the invention.

FIG. 3 and FIG. 4 are flowcharts depicting methods of optimizing crop collection with embodiments of the present invention. FIG. 3 shows a method where crop moisture level is measured directly be moisture sensor 13 on the baler. FIG. 4 shows an alternative embodiment method of optimizing crop collection in which the vehicle electronics module 10 re-estimates the moisture level without the use of actual moisture level data from the moisture sensor 13 (e.g., on the baler). These methods begin at step 302. In step 302, the data processing system 48 receives condition data from either the user interface 56 or external data sources 58 and uses that data to estimate crop moisture using the estimator 50. In step 304, the prescription generator 52 uses the estimated crop moisture and an appropriate drydown algorithm to determine an optimal collection prescription. The prescription may also be based on crop weight or volume per harvested land area. This prescription tells the operator exactly when and where to collect the crop in the field or fields. The optimal collection prescription is then transmitted to and displayed on the user interface 56.

In step 306, the baling machine or baler collects a first portion of the crop according to the collection prescription as a test sample, where the baling machine may be operated autonomously or by an operator. This first portion could be a sample of the crop, such as a small part of the windrowed crop in the field, or an entire field of windrowed crop, (e.g., among multiple fields), depending on the collection prescription or the operator's preference. For example, in one embodiment the first portion is a single bale.

In step 308, as the first crop portion is being collected, the vehicle electronics module 10 or the crop moisture sensor 13 measures the actual moisture level (e.g., measured moisture level) of the baled crop or agricultural material. The actual moisture level or measured moisture level of the windrowed crop may vary geospatially throughout the field (e.g., because of wind and sun exposure, among other factors) or any zones within the field or fields, such that estimated moisture levels are associated with geographic locations or coordinates of cells or zones within the field. Accordingly, the location-determining receiver 30 provides location data that corresponds to the actual moisture level of the baled crop. The measured crop-moisture-related data (e.g., actual moisture level, location data or both; weather data, humidity data, temperature data, precipitation data, growing degree days, sun exposure data) is then sent to or available for the estimator 50 of the data processing system 48. In this document, the actual moisture level means that the moisture sensor 13 has made at least some contribution (e.g. or the entire contribution) to the observed or measured crop-moisture-related data, either alone or in combination with actual weather, humidity, field, location data, and/or crop conditions from one or more ancillary sensors (14, 16, 18, 25) or any location-determining receiver.

In step 310, data processing system 48 uses the actual moisture level of the crop test sample to determine a revised collection prescription. In some cases, the system may recommend no further baling or collection at this stage depending on the moisture data received. In other cases, the system will proceed to step 311, where the baler begins the main collection operation of the crop. At step 312, during collection the moisture sensor 13 will continue to measure crop moisture level and send this data to data processing system 48.

In an alternate embodiment of step 408, ancillary sensors (14, 16, 18, 25) can measure various actual weather, humidity, sunlight exposure, precipitation, wind, field data, and/or crop conditions versus locations, cells or zones in the field to re-estimate the moisture level of the collected crop, alone or in combination with the crop moisture sensor 13 measuring the actual moisture level of the crop or agricultural material (e.g., in windrows in the field). This ancillary sensor data is also sent to the estimator 50 of the data processing system 48. The estimator 50 then uses the ancillary sensor data to re-estimate the moisture level of the crop in step 410.

In step 313, the estimator 50 compares the actual moisture level (e.g., provided by the crop moisture sensor 13) or the newly estimated moisture level with the previously calculated moisture value (e.g., previous moisture level from step 302) estimated by the estimator 50 from the data of ancillary sensors (14, 16, 18, 25), the commercially/publicly available sources available, or both over a communications network (e.g. Internet). For example, the estimator 50 may compare the actual moisture level with the previously calculated moisture level (e.g., from step 302) for the sampled portion of the field or the remainder of the field. If the actual moisture level (e.g., measured moisture level) of the crop is the same or within a predetermined threshold of the previous moisture value for the crop (e.g., in the same field, or cell or zone of the field), the system takes no further action and allows the system operator or baler to collect a subsequent portion of the crop according to the collection prescription. However, if the actual moisture value (e.g., measured moisture level) is not within the predetermined threshold of the previous moisture value, the system proceeds to step 314.

In step 314, the prescription generator 52 uses the actual or estimated moisture level or set of moisture level and corresponding location data from the moisture sensor 13 to derive a revision to the collection prescription for when to bale the agricultural material (e.g., in windrows) in the field or one or more cells or zones of a field. The estimated moisture level of the agricultural material (e.g., in windrows in the field) may vary geospatially throughout the field or any zones within the field or fields, such that estimated moisture levels are associated with geographic locations or coordinates of cells or zones within the field. This revised collection prescription may be based only on the actual moisture level measured by the moisture sensor 13 (e.g., on the baler) or on a combination of the actual moisture level and previous moisture values (e.g., for any given location, zone or cell within the field) or updates thereof. In one example, the estimator 50 may use the originally estimated moisture level to produce a revised estimated moisture level with an error offset or correction that is the difference (or some portion, percentage, or limit of the difference) between the previous prediction of the estimated moisture level (e.g., by the estimator 50) and actual moisture data of the baled material collected by the moisture sensor 13 (e.g., on the baler for sampled portion of the field), where the prescription generator 52 bases a revised collection prescription on the revised estimated moisture level. In another example, the estimator 50 first determines an updated estimated moisture level based on the weather, humidity, temperature, and any other parameters, available from ancillary sensors or commercially/publically available sources, (e.g., if some period time has passed since the moisture level was last estimated or the last collection prescription was prepared or sent to the end user's wireless device) and secondly adjusts the updated estimated moisture level by an error offset or correction that is the difference (or some portion, percentage, or limit of the difference) between the previous moisture levels for the sampled portion of the field and actual moisture data of the baled material collected by the moisture sensor 13 for sampled portion of the field to generate a revised or corrected estimated moisture level. The correction referenced in step 314 may be referred to as a ground-truthing correction.

In step 315, the prescription generator 52 determines a revised collection prescription for when to bale a field or zone of the fields (e.g., in the same geographic region as the sampled portion of the field in which the baler was operated to collect the actual moisture level for the crop) based on the estimated moisture level that incorporates the ground-truthing correction. For example, the prescription generator 52 may generate a revised collection prescription that provides a schedule for baling multiple zones or fields that incorporate the benefit of the ground-truthing correction associated with sample or samples of baled crop in one or more fields, where the volume or amount of crop or agricultural material baled according to revised collection prescription exceeds the volume or amount of crop baled according to an initial collection prescription during baling of a sample. In one embodiment, one bale is initially collected and then more than one bale is collected according to the revised collection prescription. In another embodiment, the prescription generator 52 is well-suited for supporting collection of crop or agricultural material at a moisture level that optimizes the longevity of storage of the crop and the nutritional value (e.g., protein content) for feeding animals or livestock.

Then, in step 316 the revised collection prescription is transmitted to the user interface 56 and an alert is sent to the operator advising of the revised prescription. The alert could take a variety of forms depending on the preference of a particular operator such as email, text message, or sound or light being emitted from user interface 56. Lastly, in step 318, the operator collects a subsequent portion of the crop according to the revised collection prescription. Steps 312 through 318 and/or 408 through 418 are then repeated until all of the crop has been collected.

While many of the foregoing embodiments have been described in the context of specific exemplary embodiments, such description is not intended to be limiting. For example, while many of the foregoing embodiments have been described in the context of the Internet, it is again noted that one or more principles of the invention may be incorporated in the context of any type of network environment. It should be understood that the invention is not be limited to any single embodiment and should only be construed in breadth and scope in accordance with recitation of the appended claims.

We claim:

1. A method for optimizing collection of a windrowed crop comprising the steps of:
   receiving first condition date;
   estimating a moisture level of the crop based on the first condition data;
   determining first optimal collection parameters based on the estimated moisture level of the crop;
   collecting a first portion of the crop with a baler according to the first optimal collection parameters;
   during the collection of the first portion of the crop, receiving a measured moisture level of the crop;
   determining revised optimal collection parameters based on the measured moisture level of the crop; and
   alerting an end user of a recommended schedule for collecting a second portion of the crop in accordance with the revised optimal collection parameters.

2. The method of claim 1 wherein the first condition data comprises at least one of actual weather conditions, predicted weather conditions, desired time of day for baling the crop, type of crop, moisture content of the crop, maturity of the crop, availability of transport for baled crop, capacity of the baler, and productivity of the baler.

3. The method of claim 1 wherein the optimal collection parameters are determined by an algorithm for the particular crop being harvested.

4. The method of claim 1 wherein the optimal collection parameters are determined by estimating crop weight or volume per harvested land area.

5. The method of claim 1 further comprising the step of collecting the second portion of the crop with the baler according to the revised optimal collection parameters.

6. The method of claim 2 wherein actual weather conditions comprise at least one of temperature, humidity, change in temperature, wind speed, and wind direction.

7. The method of claim 1 wherein the measured moisture level is collected by the baler.

8. The method of claim 1 wherein the measured moisture level is derived from the collection of the first portion of the crop.

9. The method of claim 1 wherein the optimal collection parameters comprise at least one of a particular date and time for collection, speed of collection, and geographic location of collection within a crop field.

10. The method of claim 1 wherein the revised optimal collection parameters are based on the first condition data and the measured moisture level.

11. A system for optimizing the collection of a windrowed crop comprising:
    a baler having a sensor;
    a user interface; and
    a processor for executing software configured to:
       receive first condition data;
       estimate a moisture level of the crop based on the received first condition data;
       determine first optimal collection parameters based on the estimated moisture level;
       display the first optimal collection parameters on the user interface,
       receive a measured moisture level of the crop from the sensor,
       determine revised optimal collection parameters based on the measured moisture level of the crop, and
       display the revised optimal collection parameters on the user interface;
    wherein a first portion of the crop is collected with the baler according to the first optimal collection parameters and a second portion of the crop is collected with the baler according to the revised optimal collection parameters.

12. The system of claim 11 wherein the first condition data comprises at least one of actual weather conditions, predicted weather conditions, desired time of day for baling the crop, type of crop, moisture content of the crop, maturity of the crop, availability of transport for baled crop, capacity of the baler, and productivity of the baler.

13. The system of claim 11 wherein the optimal collection parameters are determined by an algorithm for a particular crop being harvested.

14. The system of claim 11 wherein the optimal collection parameters comprise at least one of a particular date and time for collection, speed of collection, and geographic location of collection within the crop field.

15. The system of claim 11 wherein the revised optimal collection parameters are based on the first condition data and the measured moisture level.

16. The system of claim 11 wherein the measured moisture level is derived from the collection of the first portion of the crop.

17. The system of claim 11 wherein the user interface is integrated into the baler.

18. The system of claim 11 wherein the user interface is a wireless device.

19. The system of claim 12 wherein the actual weather conditions are received from a weather station located in a crop field.

20. The system of claim 11 wherein the processor is further configured to transmit an alert to a user of the baler upon the determination of revised optimal collection parameters.

21. The method of claim 1 wherein the first condition data is a measured moisture level of a portion of the crop.

22. The system of claim 11 wherein the first condition data is a measured moisture level of a portion of the crop.

* * * * *

UNITED STATES PATENT AND TRADEMARK OFFICE
CERTIFICATE OF CORRECTION

PATENT NO. : 9,807,940 B2
APPLICATION NO. : 14/871439
DATED : November 7, 2017
INVENTOR(S) : Jerome J. Roell et al.

Page 1 of 1

It is certified that error appears in the above-identified patent and that said Letters Patent is hereby corrected as shown below:

In the Claims

Column 6, Line 50, "date" should be changed to "data"

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*